United States Patent [19]

Hustig et al.

[11] Patent Number: 5,260,704
[45] Date of Patent: Nov. 9, 1993

[54] DIRECT POWER OUTPUT DIGITAL TO ANALOG CONVERSION OF DIGITAL AUDIO SIGNALS

[75] Inventors: Charles H. Hustig, Hudson, Wis.; Donald W. Moses, Eagan, Minn.; Robert S. Bradford, Woodland Hills, Calif.; Jeffrey L. Ward, Hudson; Wayne P. Olson, River Falls, both of Wis.; Janice L. Cox, St. Paul, Minn.; Raymond S. Miller; Robert W. Moses, both of Seattle, Wash.; James M. Kresse, Marlton, N.J.

[73] Assignee: Wadia Digital Corporation, River Falls, Wis.

[21] Appl. No.: 712,160

[22] Filed: May 31, 1991

Related U.S. Application Data

[63] Continuation-in-part of Ser. No. 268,830, Nov. 8, 1988, abandoned, which is a continuation of Ser. No. 597,512, Oct. 12, 1990, Pat. No. 5,075,880.

[51] Int. Cl.⁵ ...................... H03M 1/66; H03F 21/00
[52] U.S. Cl. .................................... 341/144; 381/120
[58] Field of Search ................... 341/144, 110, 141; 381/108, 120, 121

[56] References Cited

U.S. PATENT DOCUMENTS 4,408,094 10/1983 Oura .................................. 341/144
4,591,832 5/1986 Fling et al. .......................... 341/141
5,046,107 9/1991 Iwamatsu ............................ 381/107
5,086,474 2/1992 Rumreich ........................... 381/120

OTHER PUBLICATIONS

Jung, "IC Op-Amp Cookbook" 1980, pp. 315–319.
Beyerly et al. "National Semiconductor Handbook, LM380 Power Audio Amplifier" Dec. 1972 pp. AN6-9-1 to AN69-7.
Analog Devices, "Analog-Digital Conversion Handbook", 1986 p. 237.

Primary Examiner—Howard L. Williams
Attorney, Agent, or Firm—Dorsey & Whitney

[57] ABSTRACT

A direct power output digital to analog conversion of digital audio signals operates to directly convert digital audio signals into an analog power audio output signal capable of driving a speaker, such that there is no need for further amplification or modification of the audio output signal after the direct power output digital to analog conversion of the digital audio signals. The direct power output digital to analog conversion incorporates a digital-to-analog converter within the same feedback circuit as a current-to-voltage power amplifier by using a single resistive feedback network to supply the feedback signal from the output terminal of the current-to-voltage power amplifier to the summing junction of the same current-to-voltage power amplifier.

18 Claims, 10 Drawing Sheets

DIRECT POWER OUTPUT DIGITAL TO ANALOG CONVERSION OF DIGITAL AUDIO SIGNALS

RELATED APPLICATIONS

This application is related to the co-pending application, abandoned in the United States Patent and Trademark Office concurrently herewith, entitled METHOD AND SYSTEM FOR TIME DOMAIN INTERPOLATION OF DIGITAL AUDIO SIGNALS, Ser. No. 07/708,912, which is assigned to the assignee of the present invention, a copy of which is attached and hereby incorporated in the present application. The co-pending application is a continuation-in-part of an application filed in the United States Patent and Trademark Office on Nov. 8, 1988, entitled METHOD AND SYSTEM FOR TIME DOMAIN INTERPOLATION OF DIGITAL AUDIO SIGNALS, Ser. No. 07/268,830, continued as Ser. No. 07/597,512 filed Oct. 12, 1990, and issued as U.S. Pat. No. 5,075,880, which is also assigned to the assignee of the present invention and which is hereby incorporated by reference in the present application

TECHNICAL FIELD

The present invention relates generally to the field of digital audio systems. More particularly, the present invention relates to a method and system for directly converting digital audio signals into an analog power audio output signal capable of driving a speaker.

BACKGROUND ART

Digital audio systems are well known in the prior art. Presently, two types of digital audio systems are generally available, the compact disc (CD) and the digital audio tape (DAT). While the advantages of digital recordings over conventional analog recordings in terms of accuracy are well-known, until recently, digital audio systems had generally failed to attract critical listeners of professional or high-end audio systems. Such listeners are accustomed to enjoying immaculately precise and realistic music reproduction currently possible with professional or high-end analog audio systems. Although digital recordings offer superior recording capabilities, various deficiencies in existing digital audio equipment have prevented the same type of reproduction of high quality realistic music from CD and DAT digital recordings as is possible with professional analog audio systems.

The goal of any digital audio system is to sample and reconstruct an analog audio signal without noticeable changes to the original audio signal so as to recreate authentic sounding music. If, for example, the original audio signal is sampled at a recording studio and the digital samples are stored on a CD, then the CD player must retrieve the digital samples and reconstruct an analog waveform in the form of an audio output signal which is as close as possible to the waveform of the original audio signal.

One of the critical steps in this reconstruction process is the digital-to-analog conversion process wherein the digital samples are converted back into an analog signal. This step of the conversion process is typically accomplished by using a digital-to-analog converter to convert a digital sample containing a predetermined number of bits of information into a high impedance analog line signal such that the amount of current in the analog line signal is proportional to the value of that digital sample as expressed by the bits of information. Many different types of digital-to-analog converters (DACs) are well known in the prior art, including colinear DACs, resistor-ladder network DACs, multiplying DACs, flash conversion DACs and single bit DACs. Once the analog line signal is created by the DACs, it is then typically sent to an analog amplifier to produce an analog power audio output signal capable of driving a low impedance speaker.

Unlike other applications which make use of DACs as part of a digital-to-analog conversion process, the use of DACs in a high performance digital audio system involves signal quality issues that are not generally present when using DACs for other applications. Examples of such signal quality issues which are unique to the audio environment include time displacement error, low level linearity and group delay distortion. Present digital audio systems have attempted to address these issues of signal quality, as well as other issues with respect to deficiencies in the stereophonic imaging capabilities of digital audio systems by utilizing a technique known as oversampling as part of the digital-to-analog conversion process. One such oversampling technique which has received critical acclaim for improving sound reproduction in existing digital audio systems is the time domain interpolation technique which the subject of previously identified U.S. patent application Ser. No. 07/268,830, filed Nov. 8, 1988, entitled TIME DOMAIN INTERPOLATION OF DIGITAL AUDIO SIGNALS, which is assigned to the assignee of the present invention.

However, even the use of such advanced oversampling techniques as time domain interpolation has not resolved all of the deficiencies inherent in using existing digital audio systems to reproduce analog audio signals. Although the oversampling process in existing digital audio systems may reproduce a relatively accurate version of the original audio signal in digital form, the music, as heard by the listener of such a digital audio system, often suffers in comparison to high end or professional analog audio system as a result of the use of analog amplifiers as the final separate stage of the digital-to-analog conversion process.

The use of analog amplifiers as a final separate stage of the digital-to-analog conversion process of existing digital audio systems effectively prevents such systems from recreating realistic high quality sound. Present digital audio systems use DACs which are only capable of generating line level analog signals (signals having power levels on the order of 1 milliwatt and designed to drive only a high impedance load). These line level analog signals are then sent through a series of analog components to provide tone control, volume control and power amplification in order to produce the analog power audio output signal which is used to drive a speaker. Regardless of how accurate the digital-to-analog conversion process is, the use of such analog pre-amplifier and amplifier components reintroduces the very type of signal coloration and distortion and signal degradation which a digital audio system is designed to avoid. In particular, the use of analog volume control and tone control techniques after the generation of the analog line signal by the DAC inherently creates signal distortion in order to accomplish volume or tone control. In addition, the use of a separate analog power amplifier in present digital audio systems subjects the audio output signal to the nonlinear amplification range of the analog power amplifier which can further distort the audio output signal, especially those portions of the audio output signal which carry the high frequency or transient images associated with sounds such as music.

Although existing digital audio systems are adequate for reproducing musical sound, it would be advantageous to have a digital audio system which is capable of direct power output digital to analog conversion of digital audio signals so as to avoid the signal coloration and distortion and signal degradation and non-linearity problems associated with the analog pre-amplification and power amplification stages of existing digital audio systems.

SUMMARY OF THE INVENTION

In accordance with the present invention, a method and system for providing a direct power output from a digital to analog conversion of digital audio signals operates to directly convert digital audio signals into an analog power audio output signal capable of driving a speaker, such that there is no need for further amplification or modification of the audio output signal after the direct power output digital to analog conversion of the digital audio signals. The present invention incorporates a digital-to-analog converter within the same feedback circuit as a current-to-voltage power amplifier by using a single resistive feedback network to supply the feedback signal from the output terminal of the current-to-voltage power amplifier to the summing junction of the same current-to-voltage power amplifier.

In a preferred embodiment of the present invention, the direct power output digital-to-analog conversion means is used as part of a digital audio system for reconstructing high quality audio signals which includes a signal processor means for providing the digital audio signals. The signal processor means includes input means comprised of a receiver means for receiving a digital audio signal, phase lock loop means for extracting timing information form the digital audio signal, and a decoder means for demodulating the signal. The signal processor means also include a digital processor means for performing a time domain interpolation on the decoded signal to produce an interpolated data signal having proper timing accuracy and an increased sampling rate over the original digital audio signal and a digital volume control means for digitally adjusting the volume of the audio output signal that will drive the speaker.

The direct power output digital-to-analog conversion means converts the volume adjusted interpolated data signal from the signal processor means into an analog power output audio signal that may be directly connected or transmitted to a speaker to produce sound waves. In a preferred embodiment, the direct conversion to an analog power output audio signal is accomplished by a series of cascaded co-linear digital-to-analog converters (DACs) coupled to one or more instantaneous current-to-voltage operational amplifier converters, the output of which is operably connected back to the summing junction of the operational amplifier converters to form the single resistive feedback network.

Accordingly, a primary objective of the present invention is to provide a method and system for direct power output digital to analog conversion of digital audio signals that operates to immediately convert digital audio signals into an analog power audio output signal capable of driving a speaker, such that there is no need for further applification or modification of the audio output signal after the direct power output digital to analog conversion of the digital audio signals.

Another objective of the present invention is to provide a method and system for digital to analog conversion of digital audio signals directly into a power audio output signal that may be used in a digital audio system to avoid the distortion and degradation problems associated with the analog preamplification and amplification stages of existing digital audio systems.

A further objective of the present invention is to provide a method and system for power digital to analog conversion of digital audio signals which provides an analog audio output signal to a speaker as soon as the digital audio signal is converted to the analog audio output signal.

An additional objective of the present invention is to provide a method and system for direct power output digital to analog conversion of digital audio signals that may be used in a digital audio system to effectively implement a truly digital volume control that will not adversely affect the quality of the output sound.

These and other objectives of the present invention will become apparent with reference to the drawings, the description of a preferred embodiment and the appended claims.

DESCRIPTION OF A PREFERRED EMBODIMENT

The Prior Art

Figure 1:
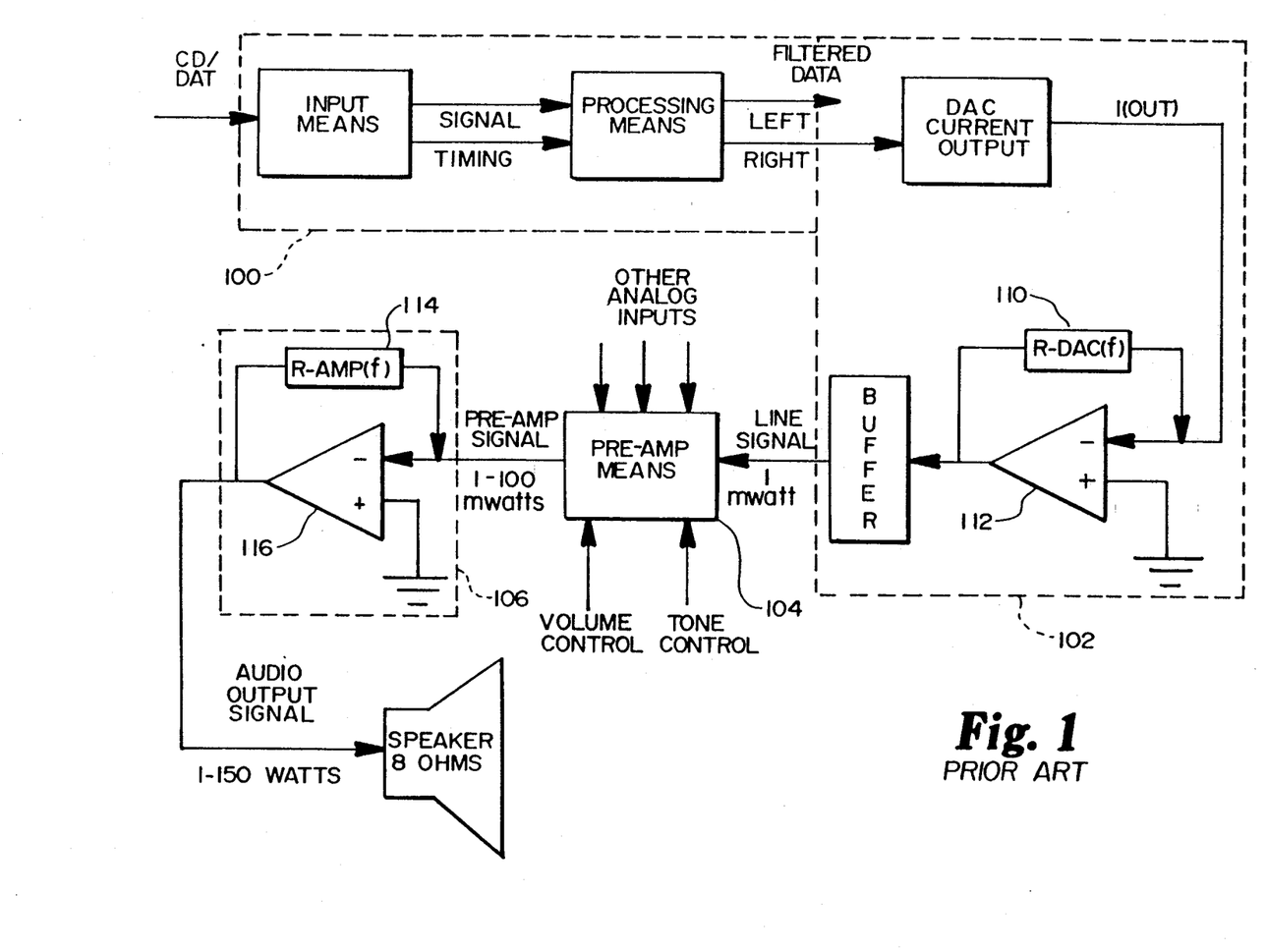
FIG. 1 is an overall block diagram of a prior art digital audio system.

Referring to FIG. 1, in most prior art digital audio systems, the digital-to-analog conversion process takes place as part of a component 100 which also generates the digital signal to be converted, e.g., a CD player. The output from a digital-to-analog converter 102 in this type of component 100 is an analog Line Signal which is approximately 1 milliwatt and which is designed to be supplied to a preamplifier 104 where tone control and volume control adjustments are made to the analog Line Signal to create a modified and volume adjusted analog Pre-amp Signal, typically ranging from 1–100 milliwatts. Usually, the preamplifier 104 will also serve as a multiplexer for several different analog audio signals. The Pre-amp Signal is then routed to an analog power amplifier 106 where the actual analog power Audio Output Signal is generated. For most audio systems, analog power Audio Output Signals typically range from 1–150 watts, depending upon the type of audio system that the power output audio signal is intended for (i.e., typical automobile audio systems range from 1–20 watts per channel, whereas typical professional and high-end audio systems may range from 5–150 watts per channel).

In general, most prior art digital audio systems use a staged approach for the generation of the Audio Output Signal which involves at least two separate stages—the generation of the Line Signal or Pre-amp Signal which typically is less than 1 watt and is designed to drive a high impedance load (greater than 10K Ohms), and the generation of the Audio Output Signal which is typically is greater than 1 watt and is designed to drive a low impedance load such as a speaker (2, 4 or 8 Ohms). A problem with current digital audio systems is that the analog amplification of the Line Signal or Preamp Signal by the analog power amplifier 106 reintroduces the very type of signal distortion and coloration and signal time displacement error problems which a digital system is supposed to circumvent.

As can be seen from FIG. 1, there generally are two feedback networks in most prior art digital audio systems: R-DAC(f) 110 associated with the DAC amplifier 112 in the generation of the Line Signal by the digital-to-analog converter 102 and R-AMP(f) 114 associated with the power amplifier 116 in the generation of the power Audio Output Signal by the analog power amplifier 106. These separate feedback networks clearly isolate the two distinct conversion/amplification stages of the digital-to-analog conversion process in most prior art digital audio systems. It should be noted that not all prior art digital audio systems use feedback networks in both stages of the entire digital-to-analog conversion process. Some of the more expensive systems use an open feedback loop or feed forward loop as part of generation of the Audio Output Signal in order to avoid using a feedback loop as part of the power amplification stage, something that is looked upon as a detriment to good analog power amplification. However, all existing commercial and high-end digital audio systems utilize some form of the generalized two stage approach for the generation of the Audio Output Signal which is shown in FIG. 1.

A completely different type of digital to analog converter with power amplification is described in U.S. Pat. No. 4,121,205. In this reference, the analog audio output signal is created by a switching network which uses different power supplies to generate the power audio output signal, rather than a current-to-voltage operational amplifier. More importantly, the feedback network for this converter is comprised of an analog-to-digital converter which samples the output signal and provides a digital feedback that is then subtracted from the original digital signal. Unfortunately, it is not desirable to use this type of analog-to-digital feedback as part of a digital audio systems because it generates unwanted time displacement error. The time displacement error is the result of the significant time delay between the generation of the audio output signal and the feedback of the analog-to-digital feedback process which effectively prevents the recreation of high quality realistic sound.

The Present Invention

Figure 2:
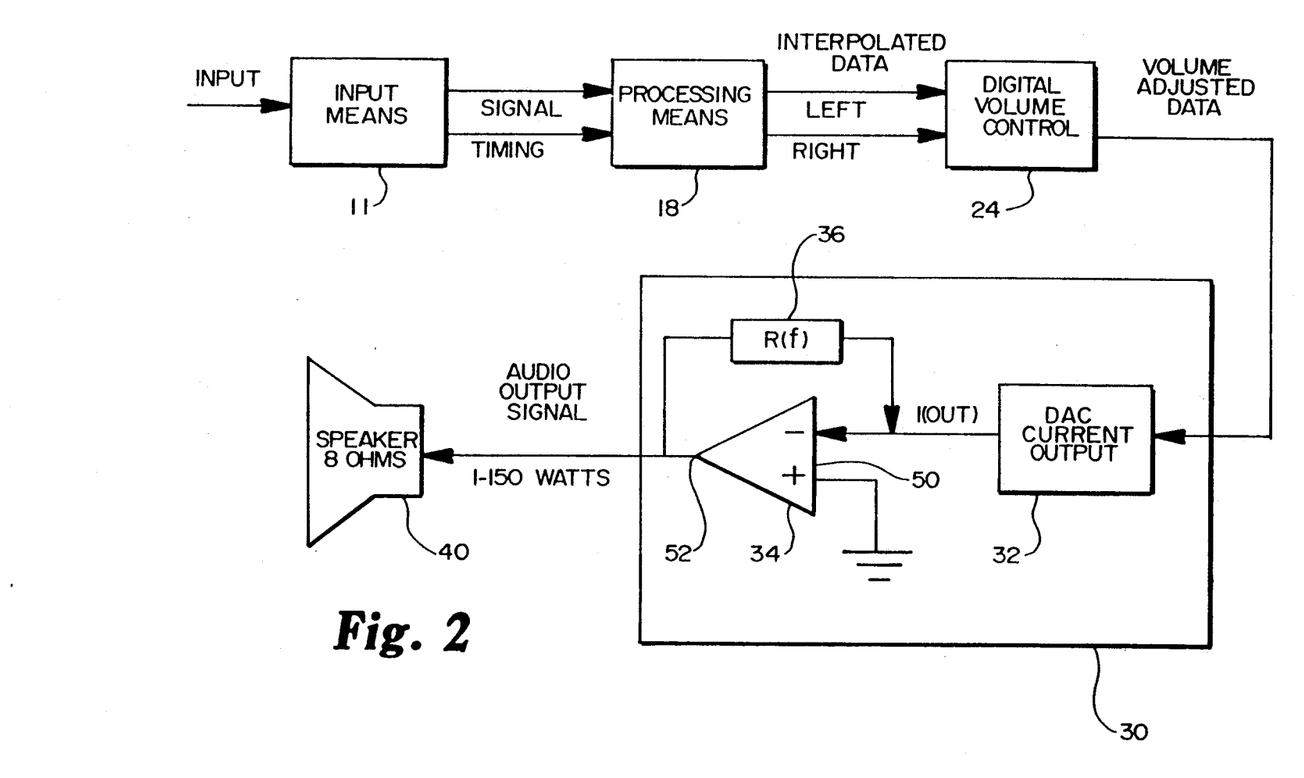
FIG. 2 is an overall block diagram of a digital audio system in accordance with the present invention.

Referring now to FIG. 2, the overall concept of the present invention as compared to the prior art will be described. In contrast to the cut-and-paste approach that mismatches the digital and audio components in existing digital audio systems, the present invention operates on the concept that a digital signal should remain completely in the digital domain until the last possible moment before it must be presented to the speaker. Only at the point at which the signal is connected to the speaker should the digital audio signal be converted back into an analog signal in order to power the speaker to produce sound waves that will be heard by a listener. This concept is consistent with the "digital" philosophy that the analog circuitry of preamplifiers, volume controls, and amplifiers, and even the cables which connect these components, create an inhospitable environment for musical audio signals that, in an ideal world, should be eliminated.

Unlike prior art digital audio systems, the power to drive the speaker 40 is developed in the same process as the digital to analog conversion of the digital signals. The present invention is not a separate digital-to-analog converter 102, with a separate volume control as part of a preamplifier 104, and a separate analog power amplifier 106 (as shown in FIG. 1) which are all simply encased in a single chasis. The present invention is, quite to the contrary, a single system that accomplishes these multiple tasks in a single process. All of the interpolation, dithering, volume control and oversampling are performed while the audio signal is in a digital format and only at the moment that the audio signal must be sent to the speaker is it directly converted from a digital audio signal to an analog power audio output signal.

As shown generally in FIG. 2, the direct power digital to analog conversion means 30 converts a Volume Adjusted Data signal received from the signal processor means 18 and digital volume control means 24 into an analog power Audio Output Signal that may be directly connected to a speaker 40 to produce sound waves. In a preferred embodiment, the direct conversion to an analog power output audio signal is accomplished by a series of cascaded co-linear digital-to-analog converters (DACs) 32 which produce a current output ($I_{out}$) that is immediately coupled to one or more instantaneous current-to-voltage operational amplifier converters 34 whose output at an output terminal 52 is operably connected back to the summing junction 50 of the operational amplifier converters 34 to form a single resistive feedback network 36. The power analog Audio Output Signal produced at the output terminal 52 is then directly connected to the speaker 40 by a premium gauge speaker cable. In a preferred embodiment, a maximum of 3 feet of speaker cable is suggested between the output terminal of the direct power digital to analog conversion means 30 and the input terminals on the speaker 40 to minimize the time between when the audio signal is converted into an analog audio output signal and the time when that signal is used to create the sound waves which a listener will hear. It will be recognized that the speaker 40 may be included in the same chassis as the direct power digital to analog conversion means 30.

As described above, most prior art digital audio systems rely on analog volume control. One prior art reference, U.S. Pat. No. 4,731,851, does suggest a digital volume control as part of an audio system; however, this reference does not teach the direct power digital to analog conversion of digital audio signals as taught by the present invention. Instead, after digital volume adjustment, an analog line signal is created by a conventional DAC which is coupled to a speaker through a conventional analog driver amplifier. Again, the mismatch of digital and analog components reintroduces the very type of signal distortion and time dispersion problems which a fully digital audio system should eliminate. The present invention overcomes this limitation in the prior art by implementing a true digital volume control and then immediately processes the Volume Adjusted Data into a direct power analog Audio Output Signal.

The incorporation of a single resistive feedback network 36 in the digital to analog conversion process represents a significant advancement over prior art digital audio systems. Regardless of what type of control process is used for the power amplification stage of prior art digital audio systems, none of the prior art digital audio systems utilize a single resistive feedback network 36 that is connected between the summing junction 50 and the output terminal 52 of an operational amplifier means 34 as taught by the present invention. The use of a single restive feedback network 36 as taught by the present invention complicates the design of a digital audio system and involves a number of issues and considerations, including: the problem of how to control the volume of the audio output signal, how to generate the voltage required to produce an analog power audio output signal, thermal considerations which are raised because of the voltage requirements, and impedance matching concerns in the design of the system for optimum audio performance.

One of the problems associated with the prior art digital audio systems which has been overcome by the present invention is the design of the power supply for the direct power digital to analog conversion means 30. In a preferred embodiment, the Audio Output Signal is implemented as a differential signal created by using +/−36 volt rail voltages to power the operational amplifier converter means 34. To generate an Audio Output Signal with sufficient power to drive a 150 watt/channel speaker, the direct power digital to analog conversion means 30 must be capable of generating at least 37.5 $V_{rms}$ (52 V) to drive an 8Ω speaker 40. By using a differential signal to drive the speaker 40, rather than a fixed voltage with fixed ground, the total voltage levels which must be supplied to the direct power digital to analog conversion means 30 are effectively halved.

In a preferred embodiment, a premium quality toroidal transformer (not shown) rated at 2 KVA is used to generate the rail voltages of ±36 volts. The ±36 volt values are used for the rail voltages to provide the necessary ±26 volts required to produce 150 watts/channel with a comfortable design margin of ±10 volts to ensure that no peak signals are clipped during the conversion and amplification process. All power supplies are fully regulated and a heavy duty RF filter isolates the unit from power line interference. A preferred embodiment of the present invention is also equipped with automatic shut-down when the outputs are shorted or when a thermal overload indicator is tripped.

The use of large power supplies and high power operational amplifiers in such systems necessarily implicates a number of thermal design considerations which are not addressed by present designs for digital audio systems. In most existing digital audio systems which have a separate power amplifier, the problems of dissipating the excess heat generated by the power amplification of the Audio Output Signal are resolved in a component which is physically separate from the circuitry associated with the digital-to-analog conversion of the digital signal into a Line Signal. As such the thermal considerations involved in a direct power digital to analog conversion process have not generally been encountered by existing digital audio systems. In the present invention, in order to dissipate the excess heat generated to produce an Audio Output Signal of 150 watts/channel without affecting the thermal characteristics of the remaining circuitry for the direct power digital to analog conversion means 30, the power amplifier converter means 34 must be provided with heat sinks (not shown) that are substantially larger than heat sinks provided on any existing digital audio system. In a preferred embodiment, the power amplifier converter means 34 for each channel are thermally coupled to a heat sink which is 8" wide and 30" high and is capable of dissipating the excess heat for an Audio Output Signal of 150 watts/channel driving an 8Ω speaker. In an alternative monolithic hybrid chip version of the present invention, the heat sinks are flange mounted fly packs coupled to the power amplifier converter means 34 for each channel.

Another issue which is not solved by present designs for digital to analog converters of existing digital audio systems is the issue of properly matching the impedance of the circuitry generating the Audio Output Signal with the impedance of the speaker that the Audio Output Signal will drive. As previously indicated, the speakers in an audio system are typically of very low impedance (2Ω, 4Ω or 8Ω). For high quality audio reproduction, it is desirable to have an effective impedance of the output terminal that supplies the Audio Output Signal that is at least two orders of magnitude smaller than the load impedance of the speaker. This factor is referred to as the damping factor of the audio system. For high quality audio systems, damping factors on the order of 500-600 are typical. Consequently, the effective impedance at the output terminal that supplies the Audio Output Signal should be on the order of 1μΩ. Unfortunately, the effective impedances at the output terminals of a typical DAC amplifiers 112 or buffers 118 (as shown in FIG. 1) are very high ($\approx$1MΩ) and, as such, are not suitable for driving a load impedance in the form of speaker 40. Another problem relating to the effective impedance of the audio output terminal is the issue of the effective impedance in terms of the frequencies of the signal being generated. For high quality audio reproduction, the output terminal that supplies the Audio Output Signal should present low impedances at audio frequencies, but should have high impedance at high frequencies (1 MHz and above) to prevent high frequency feedback into the audio system. Again, the effective impedances at the output terminals of a typical DAC amplifier 112 or buffer 118 are not suitable for this purpose. The direct power output digital to analog conversion means 30 addresses both of these issues by providing an operational amplifier converter means 34 and single resistive feedback that are properly matched to the impedance load of a speaker 40 for audio reproduction.

The Digital Audio System

Figure 3:
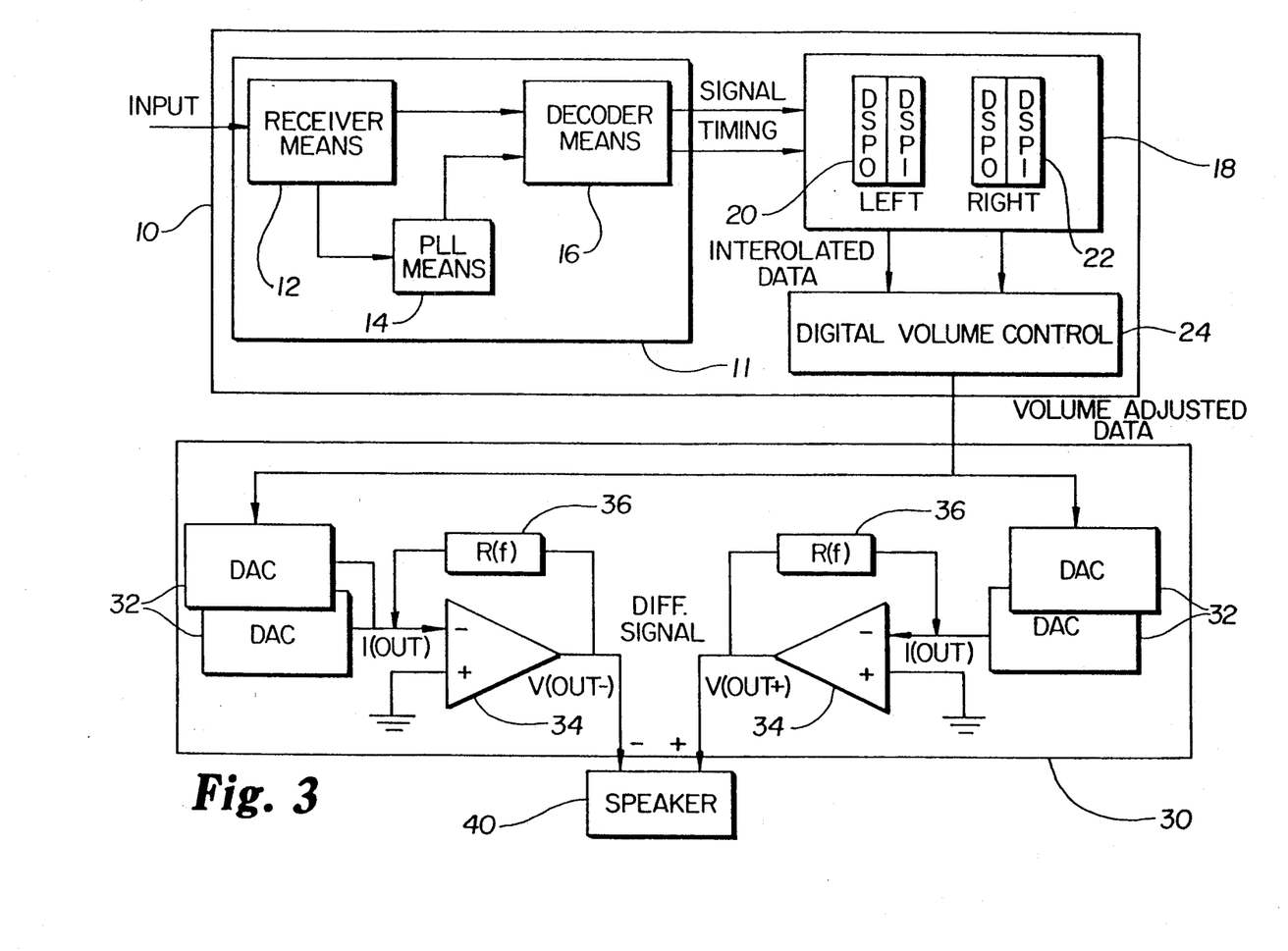
FIG. 3 is a more detailed block diagram showing a preferred embodiment of the digital audio system in accordance with the present invention.

Referring now to FIG. 3, the components of a preferred embodiment of a digital audio system in accordance with the present invention will be described. The digital audio system includes a signal processor means 10 for processing stereo digital audio signals and a direct power output digital-to-analog conversion means 30 for outputting analog power audio output signals to drive a speaker 40. For ease of representation, FIG. 3 shows only the digital-to-analog conversion means 30 and speaker 40 for one of the channel output signals (the right channel signal). Although the description of FIG. 3 is described in terms of a stereo digital audio system, it will be recognized that the signal processor means 10 and direct power output digital-to-analog conversion means 30 of the present invention are equally applicable to monaural and multi-track audio signals as well. In a preferred embodiment for use with a high performance digital audio system, a separate direct power digital to analog conversion means 30 is used for each channel of a stereo system, thereby completely isolating the audio signals for each channel.

The signal processor means 10 includes input means 11 for receiving and decoding the digital audio signals in the form of Input Data from a digital audio signal source. In a preferred embodiment, the Input Data represents digitized samples of the musical material transmitted in a predetermined stereo format (i.e., both left and right channel). The Input Data enters a receiver means 12 that receives the Input Data and then synchronizes the Input Data with an internal clock signal via a phase-lock loop means (PLL) 14. A decoder means 16 performs the data demodulation and format decoding of the Input Data to extract the Signal and Timing Data portions of the Input Data. The Signal and Timing Data are then processed by a digital processor means 18 that utilizes two digital signal processor means (DSPs) 20 and 22 to perform the time domain interpolation that results in an Interpolated Data Signal. The volume of the Interpolated Data Signal generated by the digital processor means 18 is set by a digital volume control means 24 which digitally alters the Interpolated Data Signal to Produce a Volume Adjusted Data Signal. The digital signals that comprise the Volume Adjusted Data Signal are then converted into a pair of differential power analog audio Output Signals by the direct power output digital-to-analog conversion means 30.

In a preferred embodiment, the Input Data is provided to the signal processor means 10 by a remotely located professional fiber optic transmitter (not shown) that utilizes graded index, 62.5 micron, glass optical fiber cable and metal/ceramic precision lens professional quality ST ® connectors available from AT&T, Allentown, Pa. The receiver means 12 also uses professional quality ST ® connectors, thereby creating a high-performance link for receiving the Input Data that is designed to accommodate data rates up to 50 Mbits/second and distances up to 3 km. In a preferred embodiment, the receiver means 12 may also include a daisy chain optical output connector (not shown) that also uses the professional quality ST ® connectors, thereby allowing the digital audio system to be linked with other similar digital audio systems as part of a multi-room audio installation, for example.

In a preferred embodiment, the phase lock loop means 14 is implemented as a frequency lock loop having a crystal controlled oscillator which tracks an internal clock signal to the input clock frequency. It will also be recognized that many other types of phase lock loops or clock recovery schemes could be used to accomplish the same purpose.

The decoder means 16 demodulates and decodes the Input Data to separate the Input Data into Signal and Timing Data depending upon a preselected format. In a preferred embodiment, the decoder means 10 of the signal processor means 10 may be selectably programmed to receive CD Input Data (44.1 KHz), R-DAT Input Data (48 KHz), or Satellite Input Data (32 KHz). The decoder means 16 also provides the basic clock and framing signals to the rest of the components of the signal processing means 10. In a preferred embodiment, the decoder means 16 is implemented using a first programmable gate array that incorporates the necessary digital logic to perform the standard decoding and demodulation operations for AES/EBU digital audio format. It will be recognized that there are also many commercially available decoders for standard digital audio signals which can accomplish this same function. For a more detailed explanation of the AES/EBU digital audio format, reference is made to *AES Recommended Practice for Digital Audio Engineering-Serial Transmission Format for Linearly Represented Digital Audio Data*, ANSI Standard 4.40–1985 which is fully incorporated herein by reference.

The digital processor means 18 is comprised of two parallel digital signal processor means 20 and 22, each digital signal processor means consisting of a pair of digital signal processor integrated circuits, oscillators, ROMS, and supporting buffers and latches. In a preferred embodiment, digital signal processor means 20 performs the time domain interpolation for the left channel signal and is comprised of a pair of DSPs, DSP0 and DSP1-Left. Digital signal processor means 22 performs the time domain interpolation for the right channel signal and is also comprised of a pair of DSPs, DSP0 and DSP1-Right. DSP0 and DSP1-Left and DSP0 and DSP1-Right are comprised of four WE DSP16 chips, also available from AT&T, the operation of which is more fully described in the *Data Sheet for the WE DSP16*, October, 1986, which is fully incorporated by reference herein. In a preferred embodiment, the digital signal processor means 20 and 22 generate the Interpolated Data as 16-bit digital samples. For a more detailed description of a preferred embodiment of the time domain interpolation performed by the signal processor means 10, reference is made to the previously identified co-pending application entitled TIME DOMAIN INTERPOLATION OF DIGITAL AUDIO SIGNALS. Although a preferred embodiment of the present invention utilizes digital audio signals which have been interpolated through the use of a time domain interpolation, it will be recognized that, while the audio output signal may be inferior to the audio output signal generated by a preferred embodiment of the present invention, the power digital-to-analog conversion means 30 of the present invention would work equally as well with digital audio signals which are interpolated using a frequency domain interpolation, or digital audio signals which have not been interpolated or oversampled, but, for example, have only been filtered.

The 16-bit samples that comprise a preferred embodiment of the Interpolated Data are fed into the digital volume control means 24 and a 20 bit result in the form of the Volume Adjusted Data is produced as a result of the multiplication of the Interpolated Data with a 7-bit left or right channel Digital Volume Control Value. The Volume Adjusted Data from the digital volume control 24 is then immediately sent to the direct power output digital-to-analog conversion means 30 to produce the analog power audio output signals that directly drive the speaker 40.

The digital volume control means 24 accomplishes a digital volume adjustment by means of a separate hardware multiplication of the Interpolated Data with the Digital Volume Control Value for the respective channel. The 7-bit Digital Volume Control Value allows for 128 linear volume control increments to be implemented by the digital volume control means 24. In this embodiment, the digital volume control means 24 is implemented using a shift and add-type algorithm contained in a second programmable gate array. This second programmable gate array can also handle incidental channel latching and signal connection functions between the signal processor means 10 and the direct power output digital to analog conversion means 30. In another embodiment, the function of the digital volume control means 24 is accomplished by way of a software routine within the digital signal processing means 20 and 22 that performs the same multiplication of the Interpolated Data with the Digital Volume Control Value. The separate hardware digital volume control means 24 can be used to maximize the time available to the digital signal processor means 20 and 22 for performing the time domain interpolation of the present invention, whereas the software digital volume control means 24 can be used to minimize the amount of circuitry external to the digital signal processors 20 and 22 which is required by the present invention.

A preferred embodiment also includes additional control circuitry in the form of a control microprocessor (not shown) which is used to provide control and status information about the digital audio system. For example, the control microprocessor can be used to provide the Digital Volume Control Data to the digital volume control means 24 and to receive commonds and send status information through an infra-red remote control means (not shown). The control microprocessor is also useful in performing other control and housekeeping functions associated with the circuitry of the type that are well known for this kind of electronic circuitry.

In a preferred embodiment, the direct power output digital-to-analog conversion means 30 is configured as a differential digital-to-analog converter having a transversal, summed-multiport analog delay line comprised of four DACs 32, one pair of DACs 32 for each rail voltage of the differential signal that together produce an analog current output ($I_{out}$) which is then immediately amplified to an analog power audio output signal ($V_{out}$) by the respective power current-to-voltage operational amplifier means 34. The power current-to-voltage operational amplifier means 34 includes a single resistive feedback means 36 connected between the output terminal and the summing junction input of the power current-to-voltage operational amplifier means 34 for providing a single analog feedback signal within the direct power output digital-to-analog conversion means 30. In a preferred embodiment, the DACs 32 are four conventional 20-bit co-linear DACs, for example a PCM63P available from Burr-Brown of Tucson, Ariz., or four high quality 20-bit resistor ladder DACs, for example the AD1862 available from Analog Devices of Norwood, Mass. The power current-to-voltage operational amplifier means 34 in a preferred embodiment is comprised of a set of four parallel LM12C operational amplifiers available from National Semiconductor of San Jose, Calif., that are driven by series connection from a OPA455BM operational amplifier, also available from Burr-Brown. In a preferred embodiment, the LM12C operational amplifiers are matched PNP and NPN devices that share a common silicon substrate for identical tracking of temperature and aging. These devices also have the same slew rate and setting time as typical I/V operational amplifiers in digital-to-analog conversion processes for existing digital audio systems.

In a preferred embodiment, the DACs 32 are connected so as to form a 4X delay line by summing their outputs together. In this embodiment, the first DAC 32 is delayed by ¼th of the frame time of the frame of interpolated data just calculated by the signal processor 10. The second DAC 32 is delayed ½ of the frame time, the third DAC 32 is delayed ¾th of the frame time and the fourth DAC 32 is delayed one full frame time. The data from the first and third DACs 32 forms the positive terminal of the differential Audio Output Signal ($V_{out+}$), while the data from the second and fourth DACs 32 forms the negative terminal of the differential Audio Output Signal ($V_{out-}$). The result is a first order Lagrangian interpolation filter providing four times the oversampling above what is generated by the digital signal processor means 20 and 22. This process also effectively increases the bit resolution of the Volume Adjusted Data Signal from 20-bits to 22-bits at full power. The effective interpolated resolution of the present system ranges from an effective resolution of 8-bits at 0.6 watts (the low end of the digital volume control) to an effective resolution of 22-bits at 150 watts (the high end of the digital volume control), with 19-bits effective resolution for 2.3 watts, 20-bits effective resolution for 9.4 watts and 21-bits effective resolution for 37.5 watts.

An additional advantage of using the time domain interpolation and 4X delay DACs 32 of a preferred embodiment of the present invention is that the dithering of the interpolated values is accomplished on a 16-bit sample value and the additional increase in bit resolution resulting from the digital volume control means 24 and the direct power digital to analog conversion means 30 is performed after the dithering process is accomplished. This method of performing dithering on a digital sample that has the same bit-resolution as the original digital sample contained in the digital audio signal results in a more accurate reproduction of the original audio signal. In some of the present digital audio systems which perform oversampling in the frequency domain, dithering is performed on the interpolated samples at a bit resolution higher than the bit resolution of the original digital sample (e.g., dithering at 18-bit or 20-bit resolution). As a result, these digital audio systems introduce dithering error into the reconstruction of the digital audio signal by assuming a higher degree of resolution than is actually present in the original digital sample. In contrast, the present invention achieves the same or better bit resolution without incurring such dithering error by using the digital volume control and delay line digital to analog conversion techniques to increase the bit resolution of the Interpolated Data after the interpolated samples have been dithered.

Figures 4A, 4A:
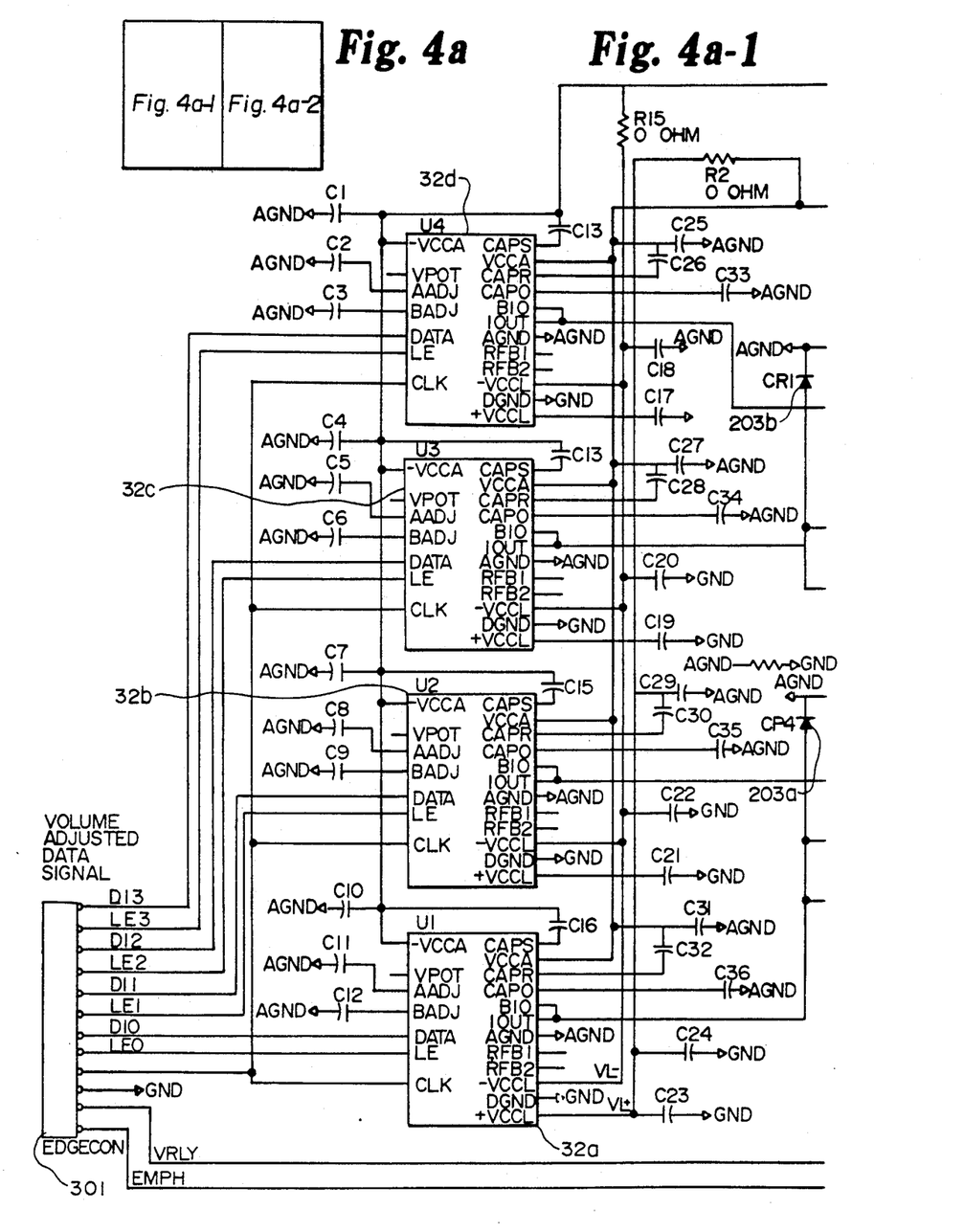
FIGS. 4a (consisting of parts labeled FIGS. 4a-1 and 4a-2) and 4b (consisting of parts labeled FIGS. 4b-1 and 4b-2) are circuit diagrams of the power output digital-to-analog conversion means of a preferred embodiment of the present invention.
Figure 4A:
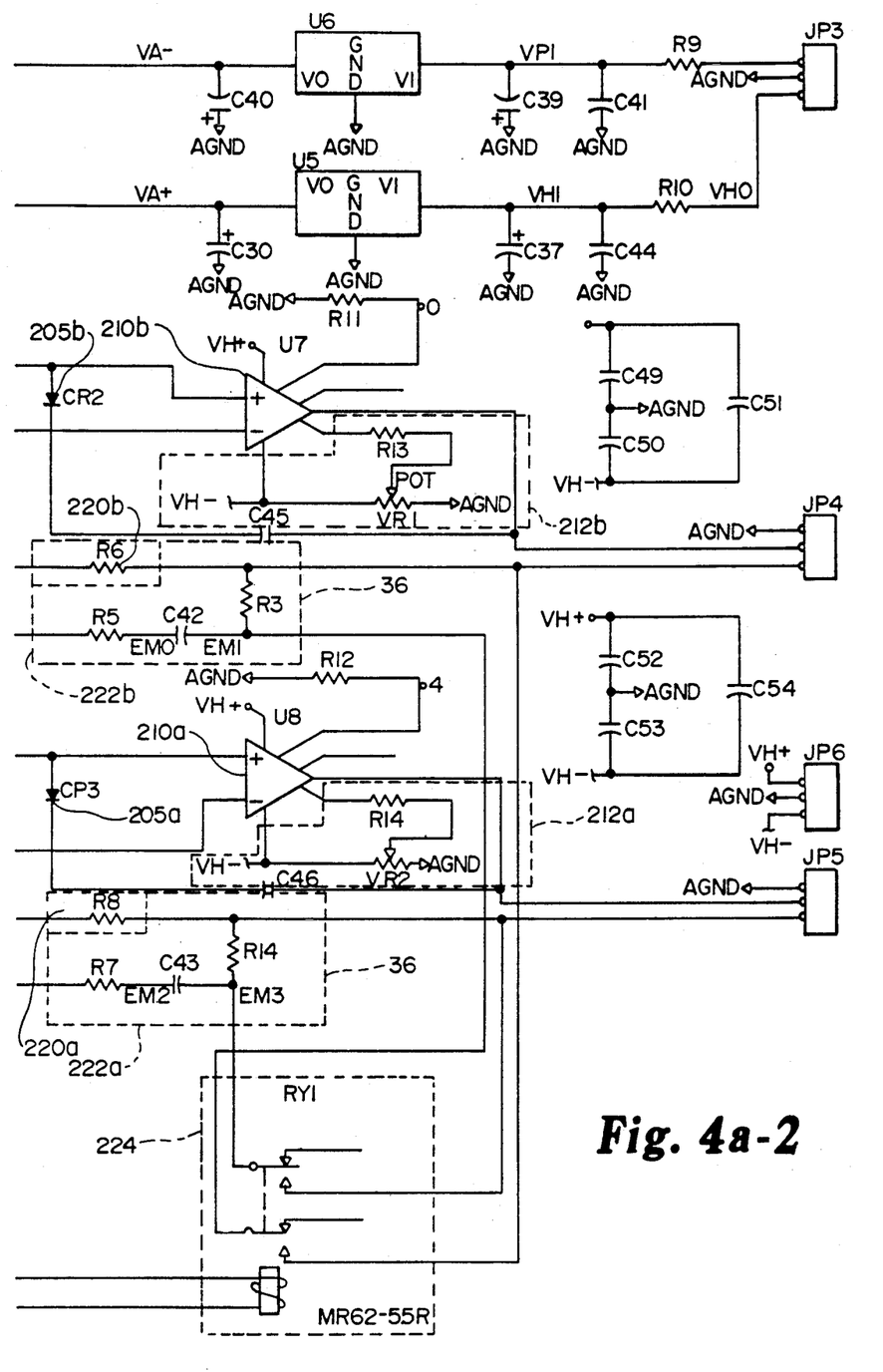
Figure 4B:
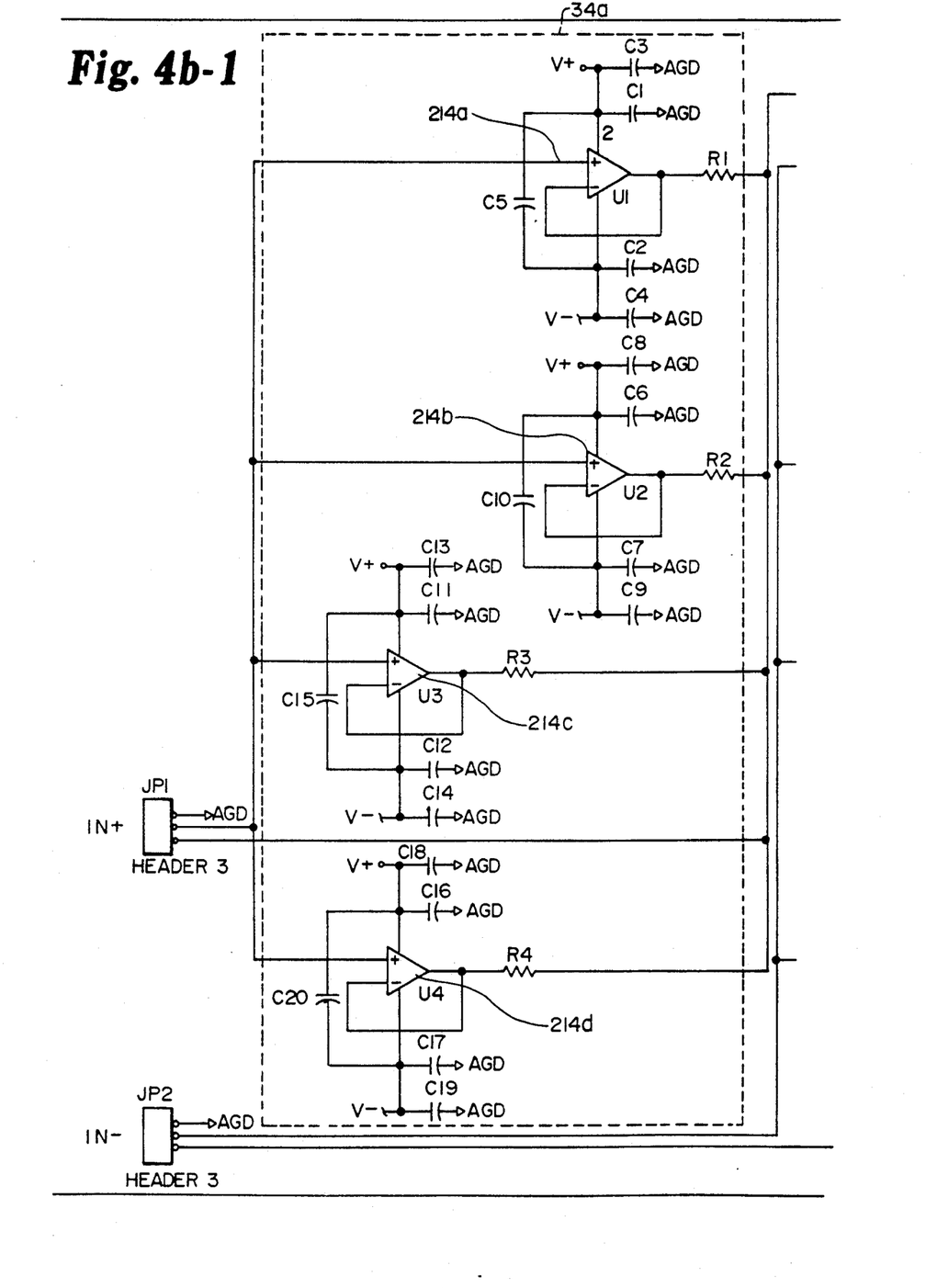
Figures 4B, 4B:
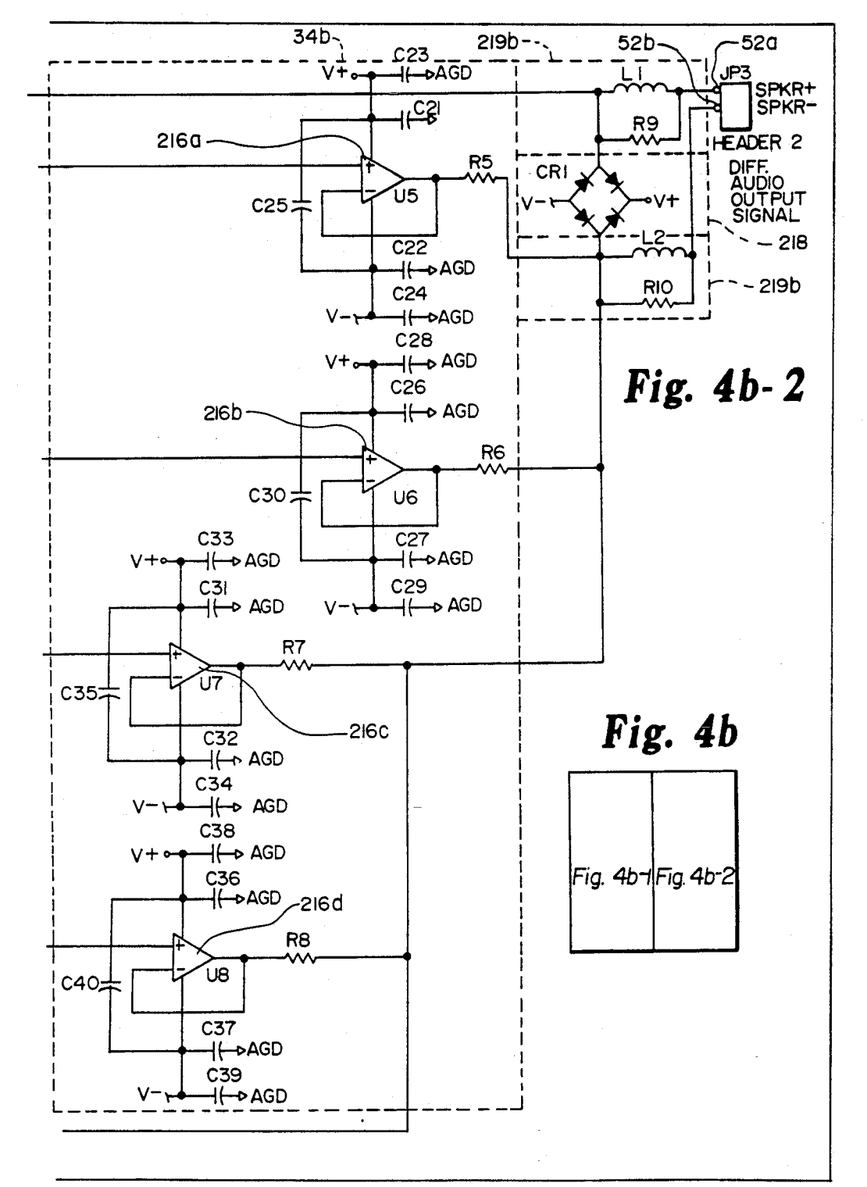

Referring now to FIGS. 4a and 4b, a detailed circuit diagram of a preferred embodiment of the present invention will be described. In this embodiment, the direct power digital to analog conversion means 30 is implemented with discrete operational amplifier components as a monaural system (e.g., one channel per conversion means 30). As shown in FIG. 4a, there are four PCM63 20-bit co-linear DACs 32a-32d which perform the digital-to-analog conversion in accordance with the transversal summed delay line configuration previously described. The Volume Adjusted Data Signal is provided to the circuit by way of four serial inputs (DI0–DI3) at edge connector 201. Latch signals (LE0–LE3) are also used to latch the Volume Adjusted Data signal into the DACs 32a–32d. The $I_{out}$ signal generated for the positive differential signal is supplied from DACs 32a and 32b through diodes 203a and 205a to operational amplifier 210a. Similarly, $I_{out}$ signal generated for the negative differential signal is supplied from DACs 32c and 32d through diodes 203b and 205b to operational amplifier 210b. The diodes 203 and 205 provide spike feedback protections for the DACs 32 that might result from a frame error or slewing condition in the circuit. The operational amplifier 210a and 210b are provided with a DC-offset adjustment circuit 212a and 212b, respectively, for tuning the particular operational amplifier at the time of manufacture of the circuit. As shown in FIGS. 4a and 4b, power amplifier converter means 34a and 34b (respectively positive and negative rails of the differential signal) are each comprised of four parallel LM12C operational amplifiers 214a, 214b, 214c and 214d and 216a, 216b, 216c and 216d, in series connection with the OPA445BM operational amplifiers 210a and 210b, respectively. The rectifying bridge network 218 as shown in FIG. 4b prevents an inductive load from generating output voltages that are greater than the rail voltages for the system. Inductor networks 219a and 219b operate as output parasitic oscillation filters to decouple the load impedance from the operational amplifiers to prevent oscillation of the power amplifier converters means 34a and 34b.

In a preferred embodiment as shown in FIGS. 4a and 4b, the single resistive feedback network 36 is comprised of feedback resistors 220a and 220b, respectively for power amplifier converter means 34a and 34b which are connected through FB1 and FB2 on FIG. 4a to the output terminals 52a and 52b on FIG. 4b, via the inductor networks 219a and 219b with the shunt-connected rectifying bridge network 218, to provide the direct feedback network for the direct power output digital to analog conversion means 30. It will be recognized that because the Audio Output Signal in a preferred embodiment is in the form of a differential signal, the single resistive feedback network 36 is comprised of two equivalent feedback resistors 220a and 220b. In this embodiment, a switchable deemphasis circuit 222a and 222b may also be effectively coupled into the feedback network 36 by means of deemphasis switch 224. The remaining circuitry includes appropriate decoupling capacitors and resistors and conventional voltage regulators 226a and 226b and other associated circuitry as will be apparent to one skilled in the art.

Figures 5, 5A:
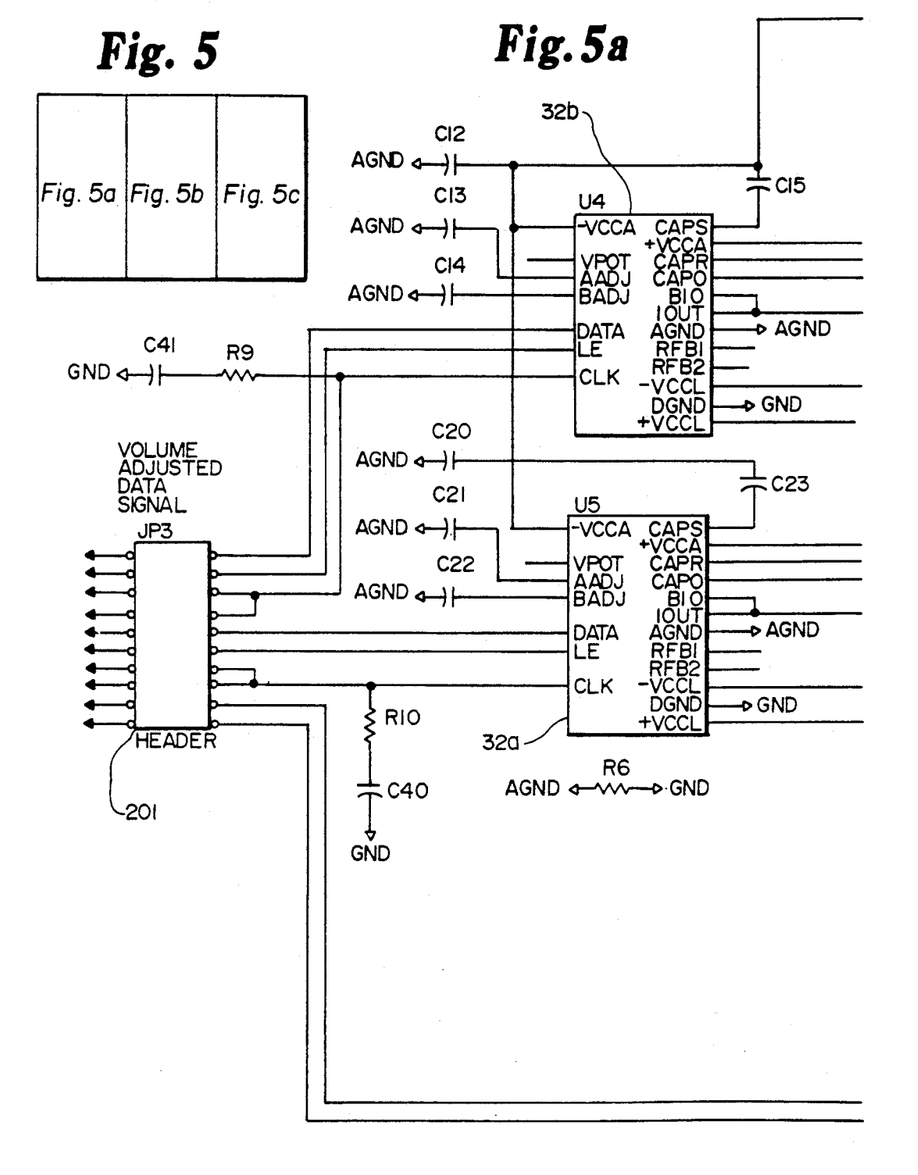
FIG. 5 (consisting of parts labeled FIGS. 5a, 5b and 5c) is a circuit diagram of an alternative embodiment of the power output digital-to-analog conversion means of the present invention.
Figure 5B:
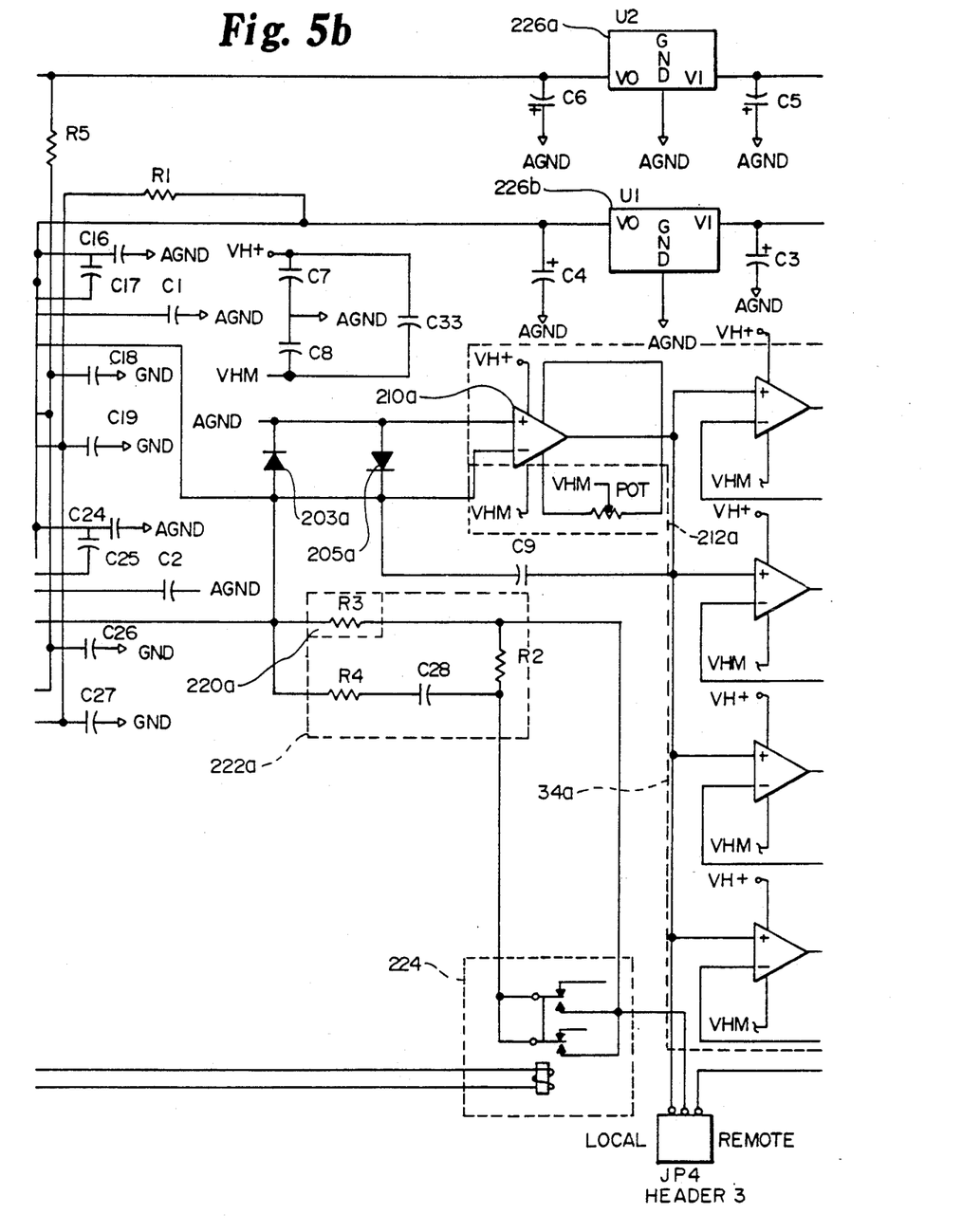
Figure 5C:
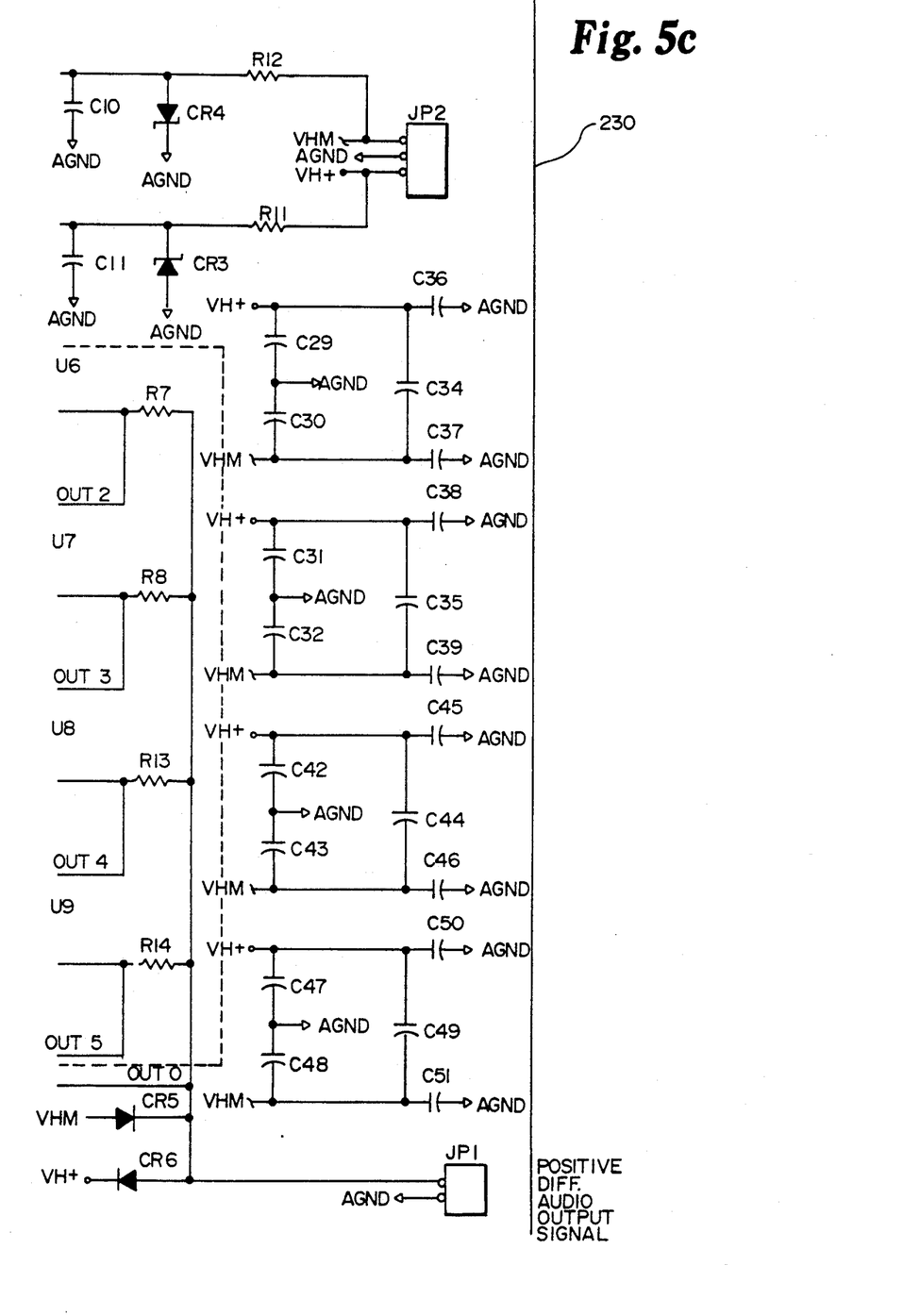

Referring now to FIG. 5, an alternative embodiment of the present invention will be described. This embodiment is suitable for incorporation onto a single monolithic hybrid chip 230. In order to provide for circuitry that can be implemented on a single monolithic hybrid chip 230 given the present state of the art, the direct power digital to analog conversion means 30 is split into two portions, one portion for generating the positive side of the differential Audio Output Signal on chip 230 as shown in FIG. 5 and a similar circuit for generating the negative side of the differential Audio Output Signal on a second chip 230. Most of the other circuitry identified on FIG. 5 is identical or similar to the circuitry shown in FIGS. 4a and 4b.

Although the description of a preferred embodiment has been presented, it is contemplated that various changes could be made without deviating from the spirit of the present invention. Accordingly, it is intended that the scope of the present invention be dictated by the appended claims rather than by the description of a preferred embodiment.

We claim:

1. An apparatus for direct power output digital to analog conversion of digital audio signals into an analog power audio output signal at a level sufficient to drive a low impedance speaker, the digital audio signals comprising a plurality of digital samples representing an analog audio signal sampled at a defined sampling rate, the apparatus comprising:
    digital-to-analog converting means for converting the digital samples to an analog current output signal;
    power current-to-voltage converting means having the analog current output signal operably connected to a summing junction of the power current-to-voltage converting means for converting the analog current output signal into the analog power audio output signal provided at an output terminal of the power current-to-voltage converting means; and
    a single resistive feedback means operably connected between the output terminal and the summing junction of the power current-to-voltage converting means for providing a feedback signal to the power current-to-voltage converting means, the analog power audio output signal being at a level sufficient to drive a low impedance speaker without further amplification.

2. The apparatus of claim 1 wherein the digital-to-analog converting means is comprised of a plurality of transversal, summed-multiport digital-to-analog converters with delay means for delaying the analog current output signal from each converter arranged such that each digital-to-analog converter is delayed by a time period in proportion to the total number of digital-to-analog converters in the converting means.

3. The apparatus of claim 2 wherein the audio output signal is a differential signal and there are four digital-to-analog converters, each converter being delayed by ¼th the time period from a previous digital-to-analog converter and the first and third of the four digital-to-analog converters are used to generate the positive side of the differential signal and the second and fourth of the four digital-to-analog converters are used to generate the negative side of the differential signal.

4. The apparatus of claim 1 further comprising means for controlling the volume of the audio output signal by digitally adjusting the value of the digital samples prior to providing the digital samples to the digital-to-analog converting means.

5. A power digital-to-analog conversion system for converting a plurality of digital data samples representing an analog audio signal into a power audio output signal for direct connection to an audio speaker, comprising:
    a signal processing means for receiving the digital data samples, interpolating the digital data samples, and digitally controlling its volume;
    digital-to-analog converting means for converting the interpolated digital data samples to an analog current output signal; and
    power current-to-voltage converting means having the analog current output signal operably connected to an input of the power current-to-voltage converting means for converting the analog current output signal into the analog power audio output signal provided at an output terminal of the power current-to-voltage converting means, said analog power audio output signal being at a level sufficient to drive the audio speaker without further amplification.

6. The system of claim 5 wherein the signal processing means comprises
input means for receiving and decoding the digital data samples;
digital processing means for interpolating the digital data samples and providing two outputs, one for a first speaker and one for a second speaker; and
digital volume control means associated with each output whereby the output of the signal processing means is a stream of interpolated digital data, the volume of which has been digitally adjusted.

7. The signal processing means of claim 6 wherein the digital processing means comprises
a first digital signal processing means for processing data to be coupled through both converting means to the first speaker; and
a second digital signal processing means for processing data to be coupled through both converting means to the second speaker.

8. The digital processing means of claim 7 wherein each digital signal processing means comprise at least two digital signal processors, one of which interpolates half of the digital data samples and the other of which interpolates the other half of the digital data samples.

9. The digital signal processing means of claim 7 wherein each digital signal processing means comprises a plurality of digital signal processors, each of which interpolates different digital data samples with the output of each digital signal processor being interleaved to provide an output to the digital-to-analog converting conversion means.

10. The system of claim 5 for use with an audio speaker having positive and negative input terminals suitable for receiving a differential power signal wherein the digital-to-analog converting means comprises
means for separating the processed digital data samples into a differential signal to be applied to the positive and negative input terminals of the speaker; and
first digital-to-analog conversion means for converting the interpolated digital data into a positive analog differential signal; and
second digital-to-analog conversion means for converting the interpolated digital data samples into a negative analog differential signal.

11. The system of claim 10 wherein the power current-to-voltage converting means is sufficient to convert the current output from the digital-to-analog converting means into a sufficiently high power audio output signal so that it can be connected directly to the differential input of the speaker.

12. The system of claim 11 wherein the power current-to-voltage converting means comprises four operational amplifiers connected in parallel.

13. The system of claim 12 wherein the power current-to-voltage converting means further comprises an operational amplifier in series with the parallel connected operational amplifiers and a single feedback network is connected between the output and the input of the power current-to-voltage converting means.

14. An apparatus for digital to analog conversion of digital audio signals into a direct analog power audio output signal for driving a speaker, the digital audio signals comprising a plurality of digital samples, the apparatus comprising:
digital-to-analog converting means for converting the digital samples to an analog current output signal;
power current-to-voltage converting means having an input operably connected to the output of the digital-to-analog converting means for converting the analog current output signal to an analog power output at an output terminal of the power current-to-voltage converting means; and
a resistive feedback means operably connected between the output terminal and the input of the power current-to-voltage converter means for providing a feedback signal to the power current-to-voltage converting means,
the speaker is driven by the analog power audio output signal to produce sound waves with no further amplification of the analog power audio output signal.

15. A method for direct power output digital to analog conversion of digital audio signals into an analog power audio output signal sufficient to drive a low impedance speaker, the digital audio signals comprising a plurality of digital samples representing an analog audio signal sampled at a defined sampling rate, the method comprising the steps of:
converting the digital samples to an analog current output signal using a digital-to-analog converter;
receiving the analog current output signal at a summing of a power current-to-voltage operational amplifier converter means for converting the analog current output signal to the analog power audio output signal;
providing the analog power audio output signal at an output terminal of the power current-to-voltage operational amplifier converter means;
generating a feedback signal to the power current-to-voltage operational amplifier converter means by providing a singlw resistive feedback network operably connected between the output terminal and the summing junction of the power current-to-voltage operational amplifier converter means; and
driving the speaker with the analog power output audio signal to produce sound waves with no further amplification of the analog power audio output signal.

16. The method of claim 15 wherein the step of converting the samples to an analog current output signal further comprises the steps of:
providing a number N of digital-to-analog converters having outputs which are operably summed together to create the analog current output signal; and
delaying the samples provided to each of the digital-to-analog converters by a time period in proportion to the total number N of digital-to-analog converters.

17. The method of claim 16 wherein the audio output signal is a differential signal and there are four digital-to-analog converters, each converter being delayed by ¼th the time period from the previous digital-to-analog converter and wherein the positive side of the differential signal is generated using analog current output from the first and third of the four digital-to-analog converters and the negative side of the differential signal is generated using the analog current output from the second and fourth of the four digital-to-analog converters.

18. A method for digital to analog conversion of digital audio signals into an analog power audio output signal for directly driving a speaker, the digital audio signals comprising a plurality of digital samples, the method comprising the steps of:

converting the digital samples to an analog current;

receiving the analog current and converting the analog current into the analog power audio output signal in a power current-to-voltage operational amplifier means for converting the analog current output signal to the analog power audio output signal;

generating a feedback signal to the power current-to-voltage operational amplifier means by providing a single resistive feedback network operably connected between the output terminal and a summing input junction of the power current-to-voltage operational amplifier means; and driving the speaker with the analog power audio output signal to produce sound waves with no further amplification of the analog power audio output signal.

* * * * *